3,493,286
REFLEX LIGHT REFLECTOR
William Garwood Bacon, Jr., 307 Highway Ave.,
Riverton, N.J. 08077
Filed Dec. 29, 1965, Ser. No. 517,270
Int. Cl. G02b 5/12
U.S. Cl. 350—105                        5 Claims

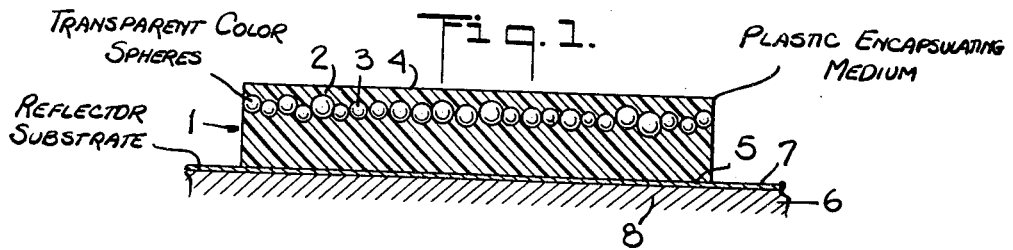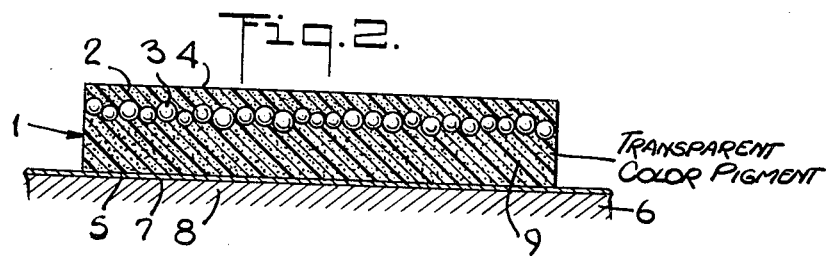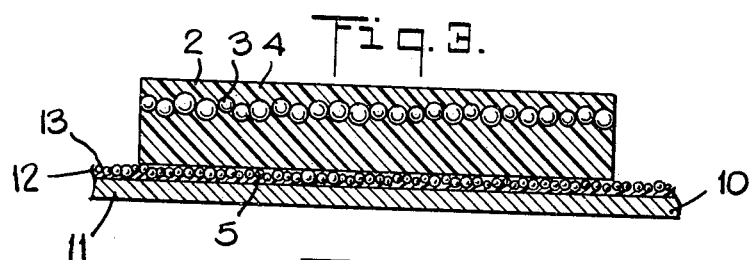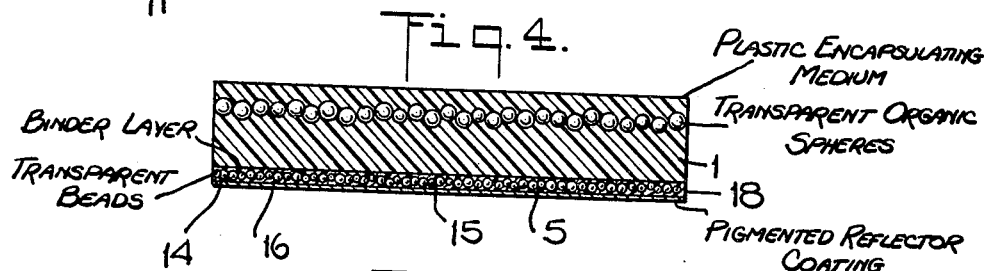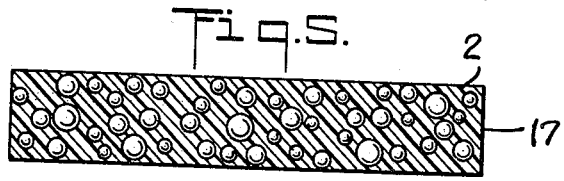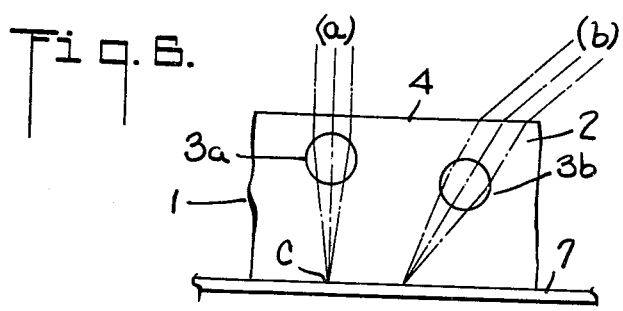
INVENTOR.
W. GARWOOD BACON, JR.
BY
ATTORNEYS

United States Patent Office 3,493,286
Patented Feb. 3, 1970

ABSTRACT OF THE DISCLOSURE

A heterogeneous and unitary light reflecting article including a continuous matrix of a transparent plastic material. Located within the matrix is a plurality of minute transparent plastic spheres of varying diameter and having a higher refractive index than said plastic material and located an optimum distance from a surface of said matrix so that when a light radiating body directs light towards the matrix at some angle of incidence, a substantial number of the spheres in said matrix will optimally reflect light back to the light radiating body from an underlying light reflecting surface.

---

This invention relates to decorative and useful light reflectant objects, and more particularly to a unitary reflex light reflector embodying a large number of spherical lenses in optical relation with an underlying light-returning substrate.

In recent years it has become common to use minute spherical glass beads as lens elements in reflex light reflecting systems. See, for example, U.S. Patent No. 3,187,068. Naturally the lens elements in such systems are set in binders and other supporting media that permit their use in a wide variety of applications, such as markers, highway signs, decalcomania, advertisement displays, etc. Many such systems consist primarily of an underlying backing which may or may not be a specular reflector, a binder film in which a glass bead is imbedded, and, sometimes one or more overlying laminate films that serve to protect the bead or help retain it in place. Necessarily, the preparation of such a composite structure requires a variety of steps—each one carefully timed and conditioned so as to obtain a light permeable laminate product that is relatively free from optical faults or structural weaknesses. However, the necessity for making two or more bonds inherently provides areas of potential weakness or optical fault within these laminate products.

Another problem is the more number of separate manufacturing steps required and the consequent high cost of production. The number of separate operations also serves to increase the proportion of unacceptable or unsuitable finished product, thus either increasing overall costs, or diminishing product quality.

Many reflective sheets comprise beaded surfaces where the bead is exposed to atmosphere. It is obvious that such materials have the drawback that the bead can be dislodged with wear and that weather conditions, particularly rain, will obscure the reflex reflective optical effects of the bead. It has therefore been proposed to place a cover over the beads in the nature of a relatively thick coating of clear plastic material, which, when properly applied, will tend to form a relatively flat outer surface. Such a surface is easier to clean and preserves the optical effects of the bead even during rainy weather.

However, as pointed out above, such proposals invariably involve the use of multiple layers of laminated plastic—each layer requiring independent application and drying to set before the next layer can be applied. Also such proposals require that the beads be confined to a particular plane in the sheet, a result that can, in some instances, limit the application of the product. Moreover, these laminate structures are available only in relatively thin sheets—a condition that, though useful for many purposes, lacks sufficient internal structural stability to be self-supporting, and also tends to prevent the effective use of transparent beads of relatively large diameter, e.g., 16 mesh.

It is consequently an object of the present invention to overcome the problems and limitations associated with the heretofore known laminated optical systems.

It is an object of the present invention to provide an economical decorative reflex light reflecting sheet having a clear or transparent continuous body in which many clear organic sphere-lenses are dispersed in optical relation to an underlying light-returning substrate.

It is also an object of the invention to encapsulate transparent organic sphere-lenses within a unitary surrounding continuum of high optical quality which forms a flat sheet suitable for forming into decorative shapes or items which resist weathering and general wear.

Yet a further object of the present invention is to provide a unitary and structurally self-supporting reflex light reflecting sheet with brilliant light returning properties over wide angles of light incidence.

It is yet a further object of the present invention to provide a unitary reflex light reflecting sheet which is capable of enhancing the brilliancy and angularity of other light reflecting materials with which it is brought into optical contact.

According to the instant invention small transparent spheres are encapsulated within a sheet of clear plastic in such a way that the bead itself is suspended between the surfaces of the sheet at a distance such that the bead is in optical relation with at least one surface.

The instant invention takes advantage of the fact that clear or transparent spheres are reflex light reflectors. That is to say, that a beam of light incident on the front of a sphere is refracted and reflected in such a manner that a cone of light is selectably returned toward the light source. This effect is noticed when the rays of light incident on the front of the sphere are bent by the sphere surfaces such that they tend to focus at a point. If a layer of light reflecting or returning material is placed at or near the aforementioned point there is returned to the light source a narrow and brilliant cone of light. One may think of the lens as collecting the light rays and concentrating them to a very small area which then becomes strikingly visible and brilliant to an observer situated in the path of the emitting cone of light. It is known, of course, that due to internal reflections and spherical aberration that the sphere will not focus paraxial light rays at a point but will tend to concentrate them in a bright disc. Nonetheless, no specific point of light is necessary to take advantage of the optical effects that are achieved. The point at which the so-called bright disc or dot becomes brightest depends upon the relative refractive indices of the medium surrounding the spherical lens and that of the lens itself. The greater the ratio of the refractive indices of the spherical lens element to the surrounding medium, the smaller the spacing becomes between the back of the sphere and the so-called focal point. The size of the sphere effects this spacing as well. The larger the sphere becomes the greater the spacing that is required. By and large the optimum spacing distance for any given size bead and for any given ratio of refractive indices is most readily achieved by empirical methods.

Heretofore it had been thought impractical to use materials in contact with the transparent bead which differed in refractive index only by a small amount, i.e., with refractive index ratios of less than 1.15. However, according to the instant invention it has been found that refractive index ratios of 1.15 or less are not only practical, but for certain applications are desirable. Thus, the instant invention makes practical for the first time the use of relatively large spacing between the reflective bead and the underlying reflector substrate. Moreover, in so doing, the instant invention permits the creation of relatively thick and sturdy unitary reflex reflector sheets which can be formed into useful articles having no need for additional structural support. The sheet may also, of course, be used in a non-structural context as well, such as when it is used to impart reflex light reflecting properties to pre-existing light-returning structures. It thus no longer becomes necessary to apply a relatively thin bead-containing film to an underlying support so as to form useful articles. Indeed, the article itself can be made solely of the reflective sheet. For example, license plates, advertising signs and road signs could themselves be entirely composed of a sturdy weather-resistant sheet which is manufactured according to the instant invention. The light-returning medium in such case would, unlike a separate substrate body, be composed of a coating applied directly to the bottom surface of the sheet.

Indeed, inasmuch as the bead encapsulating medium of the instant invention has two smooth flat surfaces, the product is ideally suited for the direct application thereto of artistic designs using a wide variety of colors. For instance, the bottom of the reflex reflector sheet can be placed over any suitable light returning medium so as to give an unusually brilliant sparkling effect thereto or the light-returning medium may take the form of a reflector coating which is applied directly to the bottom surface of the sheet in any preferred design. Moreover, the front surface of the sheet may be painted with any design—either of an opaque nature, in which case there is no reflective properties from the beads underneath, or a transparent pigment, in which case the beads reflect light back through the pigment. A combination of both opaque and transparent paints can be used to give unusual decorative effects.

These and other uses will be discussed more fully with respect to the drawings, wherein:

FIGS. 1–4 show a magnified diagrammatic view of the structures of four different reflex reflector structures made according to one embodiment of the invention.

FIG. 5 shows a magnified diagrammatic view of a reflex reflector sheet made according to another embodiment of the invention.

FIG. 6 shows a diagram in which is depicted the optical effects which are believed to occur in products made according to the invention.

Referring to FIG. 1, there is shown a reflex reflector structure 1 residing on an underlying reflector substrate composed of a light-returning coating 7 and a structural support 8. Coating 7 is in direct contact with the under surface 5 of the reflector structure 1. The reflector structure 1 has a continuous unitary body of rigid or semi-rigid transparent material 2 which completely surrounds the planar-like distribution of discrete sphere-lenses 3. Since the sphere-lenses 3 are, as shown, substantially in the same plane, they can, for most practical purposes, be considered to be uniformly spaced from the reflector substrate coating 7. Both the spheres 3 and the encapsulating continuum medium 2 are transparent and, as viewed from above, the eye sees the coloring and design that make up the light-returning coating 7 of the reflector substrate 6. However, the spacing between the sphere-lenses 3 and the coating 7 (essentially the distance between the lenses and the bottom surface 5 of the reflex reflector sheet) is such that distance light rays entering the reflector sheet 1 from above are concentrated by the sphere-lenses through which they pass to a brilliant dot or point, on the surface of the reflector 6.

This is diagrammatically illustrated in FIG. 6. The distant paraxial light rays indicated by the reference (a) approach the reflector sheet 1 at a 90° angle to the surface 4. There is no change in direction as they enter the transparent medium 2, but they are bent inwardly towards the axis by the spherical surface of the transparent bead 3. As the rays emerge from the bottom surface of bead 3 into the medium 2 they are again bent inwardly towards the axis. Barring the inevitable effects of spherical aberration and other optical side effects the rays focus at a point C which is located at or near the opaque surface of the light returning layer 7. Thereupon, the light is reflected back through the medium 2 and the sphere 3 in a divergent manner which may be described as a narrow cone of light that returns towards an observer located at or near the light source.

To an observer at the light source, it appears as a bright dot. However, inasmuch as the sphere-lenses are very small and there are many of them the total effect is one of a sparkling surface in which the whole layer is full of brilliant light. The uniformity of the above-mentioned effect depends somewhat on the size of the sphere-lenses. The larger the sphere the more individual the effect becomes and sphere-lenses of relatively large diameter, say 16 mesh, give the appearance of individual pin points of light. A smaller diameter sphere, say 120 mesh, would at the same distance of observation give a more uniform glow without individual highlights.

The size of the plastic bead may vary over a wide range, depending on the nature and thickness of the plastic sheet or film in which it is to be embodied. Beads having a diameter as small as about 1.5 mils have been found useful, and the size may be as large as 100 mils. There are usually, therefore, several hundred to several thousand such spheres per square inch.

It is noted that the spherical lenses or beads depicted diagrammatically in FIG. 1 are not of uniform size. The size distribution of the beads is a matter of choice, and the degree of uniformity desired can be achieved through the routine sieving or grading processes. There are, however, certain advantages to be obtained in providing a certain range in the bead size. For similar reasons, as hereinafter explained, it is advantageous to have a slight variataion in the distance or spacing between the beads and the bottom face 5 of the reflector sheet 1. This is brought about by the fact that, as explained above, the optimum brilliance for each bead in a given system depends not only on the diameter of the bead but its distance relative to the light-returning layer 7. This distance or spacing changes depending upon the angle at which the incident light approaches the surface 4 of the sheet 1. Consequently, a particular bead which, for its diameter, is located at the optimum distance with respect to light rays approaching from a perpendicular source of light, would not give optimum brilliance when the light approaches the sheet at a substantially different angle.

For example, consider the motorist approaching a curbside road sign at night which has a surface composed of a sheet made according to the invention. At a distance the headlights of the motorist constitute a light source which approaches the sheet in an angle almost perpendicular to the sheet; as he approaches more closely to the road sign, however, the angle of incidence decreases. When this happens the beads which returned a brilliant cone of light at a distance will diminish in brilliance since the spacing between the bottom surface of the bead and the light-returning coating along the axis of the light rays is increasing. It is no longer the optimum distance. In order to overcome this loss in brilliance the instant invention provides that certain of the beads may reside at slightly different planar levels than other of the beads. Thus, some beads are intentionally closer to the light reflecting coating than the optimum distance would dictate, yet the space of the same beads becomes optimum when the light approaches the reflector sheet at a substantial angle.

This condition is illustrated with reference to the diagram of FIG. 6. There the sphere-lens 3a is located in a slightly different plane than sphere-lens 3b. The sphere-lens 3a is at its optimum distance with respect to the reflector sheet 7 when the light rays (a) approach perpendicularly as shown. Sphere-lens 3b is not at the optimum distance. On the other hand, when the light rays (b) approach at an angle, as shown, it is sphere-lens 3b, not 3a, which is in the position of returning a brilliant cone of light towards the observer located at or near light source (b). It is, therefore, evident that by providing slight variations in the planar levels of the sphere-lens the instant invention provides for a brilliant reflex reflecting effect over a very wide angle of light incidence. It is evident that these effects are also promoted by the use of slight variations in the diameter of the sphere-lenses 3, since this causes slight variations in the optimum focal distance for the respective beads so as to provide reflex reflecting properties over wide angles of light incidence.

The number of beads 3 is preferably the amount necessary to form substantially a monolayer within the sheet 1. This increases the chances of having the maximum number of individual brilliant cones of light reflecting towards a source of light at any given angle. Within the embrace of the invention, however, it is contemplated that the amount of beads present can be both greater or less than the amount required to form a monolayer in the encapsulating medium 2.

It is readily seen that since the sphere-lenses 3 are completely surrounded by the unitary encapsulating medium 2 there are no binder layers, or spacing layers, or facing layers to be bonded together in individual operations or to be sources of potential defects. Indeed, the unitary structure of the instant invention is so simple that potential defects in the make up are practically non-existent. The encapsulating medium 2 is all of one refractive index and that of the spheres is all of one refractive index. There are, therefore, no undesirable optical effects as could result from passing between adjacent separately applied layers of laminated material.

The encapsulating medium 2 is best composed of a tough clear thermoplastic or thermosetting rigid or flexible plastic of good optical quality. The thermosetting acrylic resins are particularly suitably for this purpose, although one could use any moldable, formable or extrudable plastic that is both transparent and of lesser refractive index than the sphere-lenses, e.g., the epoxies, polyvinylchlorides or cellulose acetates.

The sphere-lenses are best composed of an organic material of good optical clarity. Particularly suitable for this purpose are the polystyrene or divinylbenzene cross-linked polystyrene beads formed by latex polymerization. These beads are now available in unusually clear and transparent quality, and have, for present purposes, three distinct advantages over the common glass bead. The organic bead has a specific gravity which is similar to the organic medium in which it is encapsulated. As a result, it is far easier to obtain bead encapsulation in manufacturing the reflector sheet of the present invention. Further, the organic bead by its process of manufacture is more optically perfect than are the glass beads. That is to say, the glass beads tend to be highly irregular whereas the organic bead is more nearly a perfect sphere. Furthermore, the organic bead lacks the surface imperfections that often mar the glass beads. Consequently, the optical qualities of the organic bead are more predictable and more effective. Moreover, the organic bead is highly compatible with the encapsulating material thus assuring a good unitary bond between them. Glass beads, on the other hand, have a tendency to separate from the binder in which they are placed, especially under stress, and hence can create vacuum pockets in the sheet which drastically alter the optical effects desired.

FIG. 2 is a diagram of a reflective sheet made according to the invention which, in its essential particulars, is the same as that described above with reference to FIG. 1. However, in this case there is provided transparent color pigment particles 9 which are distributed uniformly throughout the encapsulating medium 2. Thus the reflective cone of light will take on a hue which is effected by the color pigment. This is merely illustrative of the many decorative effects that can be achieved by use of the instant invention.

FIG. 3 illustrates the use of the instant invention in combination with an underlying substrate 10 which is itself a light reflective optical system. Thus, according to this embodiment, a reflective sheet of the type described in either FIG. 1 or 2 is placed over and in contact with an underlying reflex reflective sheet 10 having a base 11 which is coated by a binder layer 12 containing imbedded transparent beads 13. The base 11 or the binder, or both, contain light-returning pigments. The beads 13 are, like the beads 3, reflex reflecting elements which in a known manner form a brilliant illumination when light hits them at the appropriate angle. It has been found that when the spheres 13 are in optical relation to the preferably larger spheres 3 of the reflector sheet 1, there is obtained a remarkable enhancement of the light reflective properties of the reflex reflector sheet 10. Moreover, it is found that the combination of the two reflex reflector sheets—one acting as the light reflector for the other—there is obtained a far wider angularity than could possibly be achieved by the reflector sheet 10 alone. This combination has been found to be particularly effective when the light-returning coating in the reflective sheet 10 contains metallic flakes.

Although the underlying light reflective sheet is shown in FIG. 3 as a separate substrate over which the light reflective sheet 1 can be placed for advantageous effects the same or similar effects may be obtained, as shown in FIG. 4, by adhering a layer of very small transparent beads directly to the under surface 5 of the reflective sheet 1. As shown in FIG. 4 a transparent binder layer 14 is applied directly to the under surface 5 of sheet 1. This binder layer 14 is used to adhere reflective sheet 18, reflex reflecting beads 15 and a pigmented base 16. The upper surfaces of the beads 13 of sheet 18 are pressed into the binder layer 14 so as to form as firm a bond as possible. There is thereby obtained a unitary structure having two reflex light reflecting layers spaced from each other at a distance such that the encapsulated beads 3 substantially enhance the light reflecting qualities of the underlying sheet 10.

Brilliant light reflecting properties are achieved readily and with little expense by merely coating the bottom surface 5 of sheet 1 with opaque light-returning pigments in any useful design. The sheet material 1 lends itself readily to the screen printing techniques wherein intricate designs and multifarious colors and hues may be achieved. So used, the instant invention provides remarkably beautiful reflectant compositions for decorative or artistic effect.

FIGS. 1–4 illustrate reflective sheets according to the invention which are made by casting techniques, described hereinafter, which result in stratification of the transparent beads. However, by the use of injection molding or extrusion techniques, the beads may be uniformly distributed throughout the plastic continuum 2 as shown diagrammatically in FIG. 5. In this case all of the advantages are kept which are derived from the complete encapsulation of a clear organic bead within a clear continuous matrix. There is also obtained the advantages that the distances between specific spheres and the underlying coating or substrate against which the sheet 17 may be placed are so variant that there are relex reflective properties associated with the sheet at practically any angle of light incidence. This is achieved, however, at some sacrifice in the density of the number of spheres which at any particular time are at their optimum brilliance. Nonetheless, the sheet depicted by FIG. 5 is suitable for many light reflective purposes and is the least expensive to manufacture.

Reflective sheets 1 or 17 can be made in the absence of any specific contemplated end use. They are sheet materials which can be cut subsequent to any desired shape, or cold or thermo formed into a desired shape and placed in optical connection with any light-returning layer. It can be seen that a reflective sheet is capable of being used over and over again with a variety of light-returning substrates. Thus, the design on the light-returning coating could be periodically changed, as is common in the case of advertising or license plates, and the reflective sheet used, as before, over the new background.

A particularly interesting decorative effect is achieved when the underlying light-returning substrate or coating is a design or picture made by use of the photoengraving technique. The shapes and colors used in this technique are built up by the use of a multitude of very small individually colored dots. To the naked eye, however, the surface color appears to be continuous. However, the sphere-lens in the reflective sheet of the instant invention act as individual magnifying lenses and they therefore individually magnify the photoengraved dots in such a manner as to give a wondrous chromatic effect to the design as a whole. It is not necessary, for this purpose, that the sphere-lens be located at the distance which is optimum for reflex light reflecting purposes. The distances between the sphere-lens and the underlying design may be somewhat greater before any loss in effect is noted. This is due to well-known properties of magnifying lenses with relation to observers which, for all practical purposes, are at infinity. In this respect it is noted that as the distance between the sphere-lens and the underlying light-returning coating are increased, the magnification is increased. The particular effect desired is a matter of choice.

Reflex reflective sheets made according to the invention are suitably prepared by plastic casting methods. Cast plastics, and particularly cast acrylic sheets are known for their optical superiority, the smoothness and flatness of their surface, and their extreme clarity and freedom from distortion. Moreover, an acrylic sheet, including oriented acrylic sheet, is ideally suited for outdoor uses since it has excellent aging characteristics.

Consequently, the embodiment of the invention represented by FIGS. 1–4 can be prepared, for example, in the following manner. Methylmethacrylate monomer having a refractive index of about 1.41 is thickened into a viscous syrup or pre-polymer. This is suitably done by heating the monomer and an appropriate catalyst in a steam jacketed kettle until there is obtained a thickened syrup with a consistency about that of molasses at room temperature.

At this point 10% by weight of clear styrene-based polymeric beads (obtained from Ionac Chemical Co., Birmingham, N.J.) having a refractive index of about 1.59 and a size distribution of −16 +120 mesh (U.S. Standard Sieve) are added to the syrup and thoroughly admixed with it. The heterogeneous mixture becomes a fairly uniform distribution in a short while. The syrup containing the clear beads is put into casting molds made from two sheets of plate glass separated by a compressible gasket which limits the thickness of the cast sheet to about 1/8 inch. The mold is sealed with gummed paper or pressure sensitive tape. The mold containing the syrup and the distributed plastic beads is positioned in a horizontal plane for the final polymerization step.

Due to the differences between the specific gravities of the pre-polymer and the polystyrene bead, the beads through natural forces seek a common horizontal plane in the syrup. The spacing between the bead layer and the bottom of the sheet is, for all practical purposes, fixed by the pre-selected thickness of the sheet itself.

The mold containing the mixture of beads and acrylic plastic is heated in an air oven at atmospheric pressure for a period of about 28 hours at about 55° C. The temperature may, in a known manner, be raised to about 85° C. during the last several hours of cure once the exothermic nature of the curing cycle has passed. After completion of the curing cycle the mold is opened and the rigid plastic mass is removed and annealed to remove stresses.

The resulting product is a glass-clear methylmethacrylate sheet of 1/8 inch thickness having a refractive index of about 1.47 and having locked therein a visible layer of clear styrene-based polymeric beads. The beads reside near one surface of the sheet, but are completely surrounded by the methylmethacrylate polymer. They do not break the surface. Both the upper and lower surfaces of the sheet are smooth as glass. The product can be cut into any desired shape for direct application to a corresponding flat light-returning surface, as in the case of advertisements, road signs or the like. Furthermore, the sheet may be vacuum formed into any shape suited to that process. The spheres are completely protected from water and other effects of weather; they cannot become loosened and fall out as is a common occurrence with known reflective sheets, and they will not lose their brilliance in rainy weather. The completed sheet can be screen printed or otherwise painted on the underside, or placed in optical relation with any pre-existing suitable light-returning substrate to obtain the advantageous light enhancing properties of the structure.

Although the example referred to above concerned a 1/8 inch thick sheet, the same process can be used to make sheets either thinner or thicker. It must be borne in mind, however, that as the spacing increases or decreases between the bead and the surface to which the light-returning coating or substrate is applied, there should be a corresponding adjustment in the bead diameter or refractive index.

When acrylic sheets of the type referred to above are made relatively thick, they become self-supporting and can be machined to become a useful article unto itself. Thus, for example, licensed plates can be made entirely from acrylic sheets prepared according to the instant invention. The contrasting colors and lettering for the plate are painted on the back surface and holes are drilled in the plate for mounting the same. At night such plates will permit visibility to approaching motorists from substantial distances, and will be a great aid to law enforcement agencies.

The present invention also includes within its scope articles comprising the small organic transparent spheres incorporated within a surrounding plastic matrix made by the processes of extrusion, injection molding, slush molding and equivalent techniques. The result achieved from these processes, as distinguished from that referred to above with respect to cast sheets, is substantially that of the embodiment of FIG. 5 as distinguished from the embodiment of FIGS. 1–4. All processes, however, result in the encapsulation of a small clear spherical bead in a transparent continuous surrounding medium.

In both the extrusion and injection molding methods, the clear beads are thoroughly mixed with the plastic compound before it is melted and either shot into the mold or through the die as the case requires. The plastic medium must be so chosen so that its melting point is substantially less than that of the clear plastic bead so that the latter may maintain its identity throughout the process. As in the case of cast sheet it is particularly advantageous to use one of the acrylic resins, or a mixture of them, as the plastic medium for both injection molding and extrusion.

Injection molding can be used to create shaped end-products directly. On the other hand, extrusion is a useful and inexpensive way of obtaining sheet materials which can be used in the same manner as those described above with respect to cast sheet.

The plastic beads may be admixed with plasticized polyvinyl chloride (a plastisol) for use in slush molding flexible articles, such as boots. In this case, the polyvinyl chloride-organic sphere mixture is subjected to the normal molding procedure. There is produced by this technique flexible, useful articles wherein the beads give reflex light reflecting properties as previously described. It is necessary, in any event, of course, to provide some light-returning layer which underlies and is spaced apart from a significant number of the beads.

Film-like materials can be made according to the invention through the use of film-casting techniques. For example, clear film-forming plastics such as cellulose acetate, cellulose butyrate, polyvinyl chloride and the acrylic resins can be dissolved in suitable solvents to form viscous solutions. These are filtered, if necessary, and then admixed with a portion of very small divinylbenzene cross-linked polystyrene beads. The resulting dispersion-solution is deposited as a film on a mirror-like continuous band, and as the solvent is evaporated there is obtained a glass-clear film containing the trapped organic beads. This method is advised only if beads of very small size are used, i.e., sizes consistent with the total encapsulation of the bead. Also, in order to permit many of the beads to be positioned at the optimum spacing for maximum reflex reflectance it is preferred to use an organic bead having as high a refractive index as possible.

Although for most applications it is suitable to use water-clear transparent beads, it is sometimes beneficial to use beads having a transparent colored pigment distributed in them.

What I claim is:

1. A one piece heterogeneous and unitary light reflecting sheet article consisting essentially of a continuous matrix of a light rigid transparent plastic material having an upper and a lower surface, a plurality of varying diameter minute transparent plastic spheres dispersed entirely in said matrix of plastic material and each of said spheres having a higher refractive index than said transparent plastic material, the specific gravity of said spheres being approximately equal to but slightly greater than that of the plastic material forming said matrix, said spheres being uniformly distributed in said matrix so that when a light radiating body directs light towards the upper surface of said article at some angle of incidence and the lower surface is in contact with a light reflecting surface, a substantial number of said spheres will optimally reflect light back towards the light radiating body, from said light reflecting surface.

2. The article according to claim 1 wherein said spheres are oriented substantially in a single plane in said sheet material closer to one surface of said sheet material than a second surface of said sheet material, said second surface parallel said first surface.

3. An article according to claim 1, wherein said plurality of varying diameter spheres are dispersed in a plurality of planes within said plastic material.

4. The article according to claim 1 including a layer of small transparent beads adjacent the lower surface of said rigid transparent plastic material, said beads being disposed within a reflective sheet adhered to said lower surface of said rigid transparent plastic material, said spheres being spaced from said beads at a distance such that the light reflecting qualities of said article are enhanced.

5. The article according to claim 4 including a pigmented reflector coating adhered directly to the surface of said reflective sheet furtherest removed from said lower surface of said rigid transparent plastic material.

References Cited

UNITED STATES PATENTS

| 2,387,038 | 10/1945 | Owens | 350—105 |
| 3,176,420 | 4/1965 | Alverson | 350—105 |
| 3,253,146 | 5/1966 | De Vries | 350—105 |
| 3,311,441 | 3/1967 | Gill | 350—105 |
| 2,383,884 | 8/1945 | Palmquist | 40—135 X |
| 2,407,680 | 9/1946 | Palmquist | 40—135 X |
| 3,176,584 | 4/1965 | De Vries | 40—135 X |
| 3,154,872 | 11/1964 | Nordgren | 40—135 |
| 3,254,563 | 6/1966 | De Vries | 350—105 |

PAUL R. GILLIAM, Primary Examiner

U.S. Cl. X.R.

40—135; 350—109